United States Patent
Hoshino et al.

(10) Patent No.: US 8,284,306 B2
(45) Date of Patent: Oct. 9, 2012

(54) METHOD AND UNIT TO PROCESS AN IMAGE SIGNAL INVOLVING FRAME RATE CONVERSION TO IMPROVE IMAGE QUALITY

(75) Inventors: Takaya Hoshino, Saitama (JP);
Shinichiro Miyazaki, Kanagawa (JP);
Seiko Imai, Chiba (JP)

(73) Assignee: Sony Corporation (JP)

( * ) Notice: Subject to any disclaimer, the term of this patent is extended or adjusted under 35 U.S.C. 154(b) by 516 days.

(21) Appl. No.: 12/462,375

(22) Filed: Aug. 3, 2009

(65) Prior Publication Data
US 2010/0033620 A1    Feb. 11, 2010

(30) Foreign Application Priority Data
Aug. 7, 2008   (JP) ................. P2008-203859

(51) Int. Cl.
*H04N 7/01* (2006.01)
(52) U.S. Cl. ........ 348/441; 348/452; 348/443; 348/700; 382/236; 382/275
(58) Field of Classification Search .......... 348/441, 348/451, 452, 699, 700, 413.1, 416.1, 443, 348/459; 382/236, 264, 275; 375/240.01, 375/240.16, 240.27
See application file for complete search history.

(56) References Cited

U.S. PATENT DOCUMENTS

| | | | | |
|---|---|---|---|---|
| 7,965,303 B2 * | 6/2011 | Hanaoka et al. | ............... | 345/606 |
| 2003/0107672 A1 | 6/2003 | Hoshino et al. | | |
| 2005/0062886 A1 | 3/2005 | Hoshino et al. | | |

FOREIGN PATENT DOCUMENTS

| | | |
|---|---|---|
| EP | 1303136 A2 | 4/2003 |
| EP | 1460847 A1 | 9/2004 |
| EP | 1513344 A1 | 3/2005 |
| JP | 3596521 A | 9/2004 |
| JP | 3855761 A | 9/2006 |

OTHER PUBLICATIONS

Communication report from EP Application No. 09167372.3-2202, dated Mar. 28, 2011.
European Search Report EP 09167372, dated Jun. 18, 2010.

(Continued)

*Primary Examiner* — Jefferey Harold
*Assistant Examiner* — Jean W Desir
(74) *Attorney, Agent, or Firm* — Lerner, David, Littenberg, Krumholz & Mentlik, LLP

(57) ABSTRACT

An image signal processing unit includes a frame rate conversion circuit performing double frame rate conversion on an input image signal from a first frame frequency to a second frame frequency. When performing frame rate conversion with the motion correction process, a motion vector is determined between a first frame image and a third frame image, and three interpolation frame images are formed through the motion correction process to the first frame image based on the motion vector, and are inserted between the first and third frame images so as to establish the second frame frequency. When performing frame rate conversion without the motion correction process, an interpolation frame image same as the first frame image is inserted between the first and second frame images, and an interpolation frame image same as the second frame image is inserted between the second and third frame images.

4 Claims, 12 Drawing Sheets

OTHER PUBLICATIONS

De Haan G et al: IC for Motion-Compensated 100 Hz TV With Natural-Motion Movie-Mode 19960501, vol. 42 No. 2, May 1, 1996, pp. 165-174 XP011008226.
Communication from EP Application No. 09167372.3, dated Feb. 14, 2012.

Heinrich Waterholter: "Scan conversion using the SAA4998 (FALCONIC-EM)", Philips Semiconductor, Apr. 30, 2003, pp. 1-131, XP 55018551, Retrieved from the Internet: URL:http://www.tridentmicro-com/wp-content/uploads/2010/01/scan_conversion_using_the_SAA4998_falconic_em.pdf.

* cited by examiner

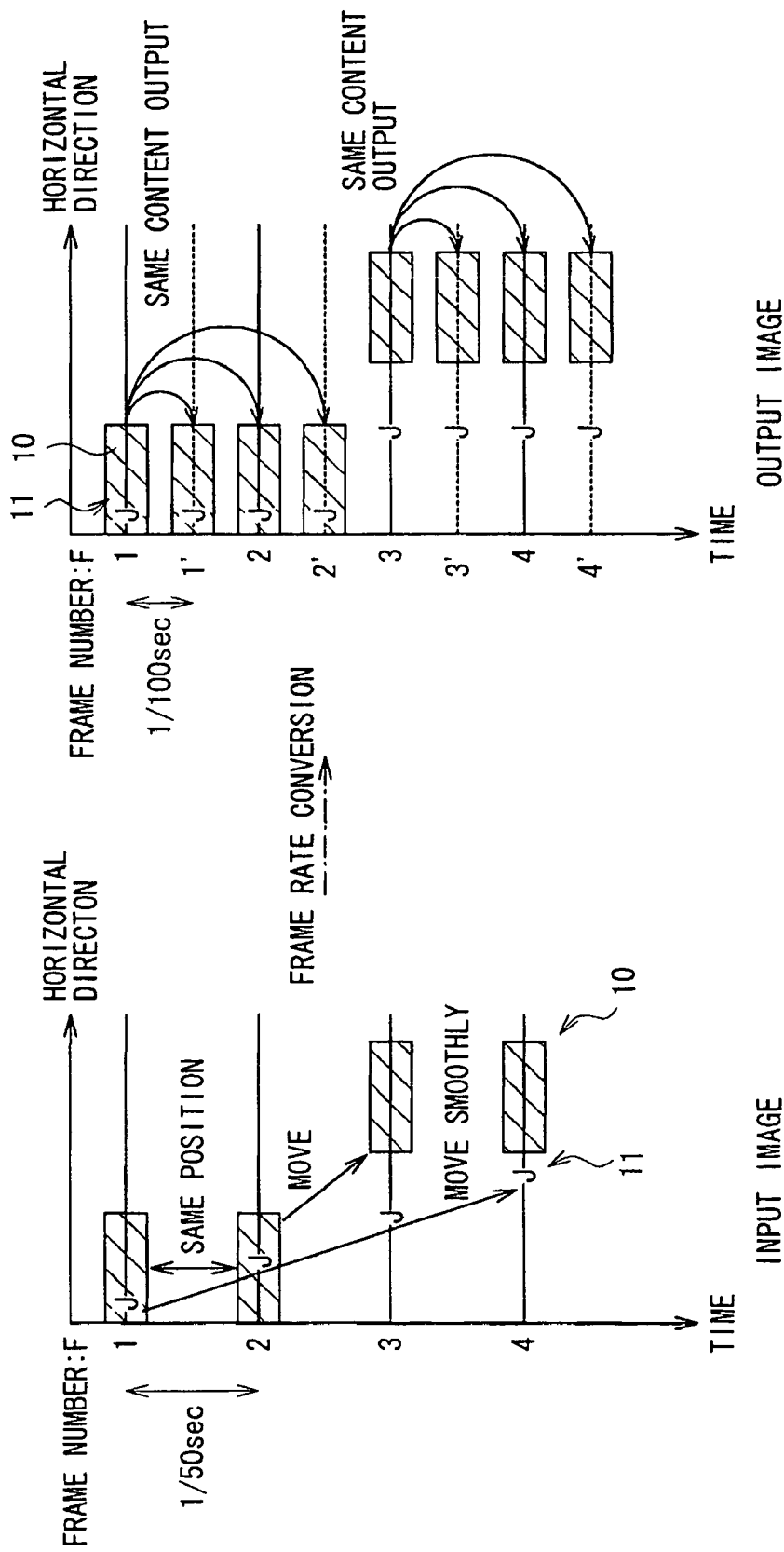

METHOD AND UNIT TO PROCESS AN IMAGE SIGNAL INVOLVING FRAME RATE CONVERSION TO IMPROVE IMAGE QUALITY

CROSS-REFERENCE TO RELATED APPLICATION

The present application claims priority from Japanese Patent Application No. JP 2008-203859 filed in the Japanese Patent Office on Aug. 7, 2008, the entire content of which is incorporated herein by reference.

BACKGROUND OF THE INVENTION

1. Field of the Invention

The present invention relates to a technique to improve image quality in the case where, for example, a frame rate is converted twice in such a manner that a frame frequency is converted from 50 fps (frames per second) to 100 fps in a TV (television) receiver. In particular, the present invention relates to an image signal processing unit and a method of processing an image signal, which improve the image quality in the case where, for example, an image in which a normal signal (for example, a telop) with a frame rate of 50 fps is superimposed on a film signal with a frame rate converted from 25 fps to 50 fps is input.

2. Description of the Related Art

In the TV receiver, for example, when an image with a frame rate of 50 fps such as a PAL (phase alternating line) signal is displayed, there is a shortcoming that a whole screen flickers, that is, "plane-flicker disturbance" occurs in, for example, a CRT-based display apparatus. To solve this shortcoming, a frame rate conversion which solves the plane-flicker disturbance by setting the frame frequency high has been used. In this frame rate conversion, for example, the frame frequency is converted from 50 fps to 100 fps. Such a frame rate conversion is also used to improve blurring of a moving image in, for example, a display apparatus of a liquid crystal method.

On the other hand, for example, an image signal used for a movie shoot has the frame frequency lower than that of a typical TV signal, and is, for example, a film image signal with a frame rate of 25 fps. For this reason, a process called a television-cinema conversion (telecine conversion) in which a signal format of a film image signal is converted to that of the typical TV signal has been performed. As an example of the telecine conversion, for example, there is a 2-2 pull-down in which the film image signal with a frame rate of 25 fps is converted to the image signal of the PAL method with a frame rate of 50 fps.

FIG. 5 indicates an example of a film image 10 configured by converting the frame rate from 25 fps to 50 fps through a 2-2 pull down. FIG. 5 is an example of the film image 10 in which an object moves in a right direction in a screen. Although the TV signal has a frame rate of 50 fps, the image content is the a film image 10 configured by converting the frame rate from 25 fps to 50 fps through a 2-2 pull down. Thus, each two successive frames in the TV signal have the same image content. Accordingly, in the case where the object moves in the screen, as indicated in FIG. 5, a first frame F1 and a second frame F2 have the same image content, and the object is in the same position. The position of the object moves in a third frame F3. The third frame F3 and a fourth frame F4 have the same image content, and the object is in the same position in the third frame F3 and the fourth frame F4. The position of the object moves in a next fifth frame F5. In this manner, in the film image, since the image moves with a frame rate of 25 fps in the screen, there is a shortcoming that the motion of the image is not visually smooth. This unsmooth motion is called "judder".

To solve this shortcoming, "a motion correction process" is added. In the motion correction process, a motion vector of an input image is obtained, and an image which is shifted in accordance with the amount of the obtained motion vector is inserted as an interpolation frame image, thereby realizing smooth motion. This process has been widely used.

Here, with reference to FIGS. 6A and 6B, operation to smooth the motion of the image will be described. In this case, the input image with a frame rate of 50 fps is the film image configured by converting the frame rate from 25 fps to 50 fps through a 2-2 pull down, and the frame rate is converted from 50 fps to 100 fps by adding the motion correction process. FIG. 6A indicates the input image before the frame rate conversion is performed, and FIG. 6B indicates the output image after the frame rate conversion involving the motion correction process is performed. In FIGS. 6A and 6B, the vertical axis indicates time, and the horizontal axis indicates a position of the image in the horizontal direction.

The content of the input image indicated in FIG. 6A is substantially the same as that of the film image 10 indicated in FIG. 5. Similarly to FIG. 5, in the image content, the object moves in the right direction. This input image is configured by converting the frame rate of the film image 10 from 25 fps to 50 fps through a 2-2 pull down. In the input image, each two successive frames have the same image content. Thus, when the object moves in the screen, as indicated in FIG. 6A, the image of the first frame F1 and the image of the second frame F2 are in the same position, and the object largely moves in the third frame F3. The fourth frame F4 is displayed in the same position as that of the third frame F3. At this time, between the first frame F1 and the third frame F3 which is two frames after the first frame F1 in the input image, the motion vector of the image is obtained by, for example, block matching method as a known method. The motion vector is obtained for each pixel unit, or for each block having a certain size. The obtained motion vector amount is regarded as A.

As indicated in FIG. 6B, in accordance with the obtained motion vector amount A, interpolation frame images are formed by shifting the image of the first frame F1 in the input image by the amounts of $A \times \frac{1}{4}$, $A \times \frac{2}{4}$, and $A \times \frac{3}{4}$. These interpolation frame images obtained by shifting are displayed as a frame F1', a frame F2, and a frame F2', respectively, in the output image with a frame rate of 100 fps, and thereby smooth motion with a frame rate of 100 fps is realized.

FIG. 7 indicates an example of the configuration of an image signal processing unit of the related art which performs the frame rate conversion as descried above. In the image signal processing unit, an input signal 152 is input from an input terminal 151 to a frame rate conversion circuit 153. As indicated in FIGS. 5 and 6A, the input signal 152 is a film image signal configured by converting the frame rate from 25 fps to 50 fps through a 2-2 pull down (as an image format, an image signal with a frame rate of 50 fps). The frame rate conversion circuit 153 includes a first frame memory 154, a second frame memory 155, and a third frame memory 156. The frame memories 154, 155, and 156 are image memories each temporarily storing image data of one frame. The frame rate conversion circuit 153 also includes a film phase detection circuit 160, a motion vector detection circuit 161, a switch 162, and a double rate conversion/image shift circuit 166.

In the frame rate conversion circuit 153, the image is delayed with the first frame memory 154 and the second frame memory 155 which are frame memories for two frames, and, by using the input signal 152 and a two-frame delayed signal 158, a motion vector 165 between two frames is obtained with the motion vector detection circuit 161 by block matching method or the like. Moreover, by using the input signal 152 and a one-frame delayed signal 157, a correction timing in accordance with a film phase of the input image is obtained with the film phase detection circuit 160. The above-mentioned two-frame delayed signal 158 is further delayed by one frame with the third frame memory 156, thereby obtaining a three-frame delayed signal 159. The two-frame delayed signal 158 and the three-frame delayed signal 159 are supplied to the switch 162. In the switch 162, by inverting the switching operation for every one frame, the image of the odd-numbered frame in the input image is generally selected, and regarded as a selection signal 163.

On the other hand, the obtained motion vector 165 and a correction timing signal 164 are input to the double rate conversion/image shift circuit 166. By the operation of the switch 162, the selection signal 163 in which the image of the odd-numbered frame in the input image is generally selected is input to the double rate conversion/image shift circuit 166. In the double rate conversion/image shift circuit 166, the frame rate of the image of the odd-numbered frame is converted so that the converted frame rate is twice that of the input signal, and then an image position is appropriately shifted in response to the motion vector 165 and the correction timing signal 164. Thereby, the output signal 167 whose motion is improved to be smooth is obtained.

As described above, the image is appropriately moved when the motion vector is obtained and the frame rate is converted, and thereby the smooth motion is realized. Japanese Patent Publication Nos. 3596521 and 3855761 each discloses the invention regarding the image signal processing unit which performs such a frame rate conversion.

SUMMARY OF THE INVENTION

In TV images, there are some cases where an image such as a telop which is different from a source image is superimposed on the source image. In this case, even if the source image is a film image with a frame rate of 25 fps, the image which is superimposed on that source image is a normal signal with a frame rate of 50 fps.

FIG. 8 indicates an example of an image in which a normal image 11 with a frame rate of 50 fps is superimposed on the film image 10 configured by converting the frame rate from 25 fps to 50 fps through a 2-2 pull down. In this example, a telop (normal image 11) moving to the right with a frame rate of 50 fps is superimposed on a background screen (film image 10) moving to the right with a frame rate of 25 fps in the screen. The background screen is the film image 10 which is the same as that in the example of FIG. 5. In the background screen, the first frame F1 and the second frame F2 have the same image content, and the moving object is in the same position. After that, the image content changes in the third frame F3 which is two frames after the first frame F1, and the object moves. On the other hand, the superimposed telop is displayed while the position of the telop moves in each frame with a frame rate of 50 fps.

Here, with reference to FIGS. 9 and 10, the description will be made for the process when the frame rate conversion involving the motion correction process is performed in the case where the image as in FIG. 8 is input as an input signal. FIG. 9 indicates the input image before the frame rate conversion is performed, and FIG. 10 indicates the output image after the frame rate conversion involving the motion correction process is performed. In FIGS. 9 and 10, the vertical axis indicates time, and the horizontal axis indicates a position of the image in the horizontal direction.

The content of the input image indicated in FIG. 9 is substantially the same as that of the image indicated in FIG. 8. Similarly to FIG. 8, the image content in FIG. 9 is an image in which the normal image 11 with a frame rate of 50 fps is superimposed on the film image 10 configured by converting the frame rate from 25 fps to 50 fps through a 2-2 pull down. As indicated in FIG. 9, in the input image, between the first frame F1 and the third frame F3 which is two frames after the first frame F1, the motion vector of the image is obtained by, for example, block matching method as a known method. The motion vector of the image is obtained for each pixel unit, or for each block having a certain size. Here, the motion vector amount of the object in the film image portion with a frame rate of 25 fps is regarded as A. The motion vector amount of the superimposed telop portion with a frame rate of 50 fps is regarded as B.

As indicated in FIG. 10, in accordance with the obtained motion vector amount A, the film image portion in the image of the first frame F1 in the input image is shifted by the amounts of $A \times \frac{1}{4}$, $A \times \frac{2}{4}$, and $A \times \frac{3}{4}$. In accordance with the obtained motion vector amount B, the telop portion in the image of the first frame F1 in the input image is shifted by the amounts of $B \times \frac{1}{4}$, $B \times \frac{2}{4}$, and $B \times \frac{3}{4}$. The images in which the telop portions obtained by shifting are superimposed on the film image portions obtained by shifting, respectively, are displayed as the frame F1', the frame F2, and the frame F2' with a frame rate of 100 fps.

In this manner, even in the case where the image on which the normal image 11 with a frame rate of 50 fps is superimposed is input as the input image, the same process is performed as in the above-described case where the image configured with only the film image 10 is input as the input image (FIGS. 6A and 6B), and thereby it is realized that both of the film image portion and the normal image portion (telop) smoothly move with a frame rate of 100 fps.

Here, in the above-described frame rate conversion, to make the motion smooth (to improve judder), "the motion correction process" is necessary. Next, the case where "the motion correction process" is stopped will be described. For example, in a block matching circuit to obtain the motion vector, when the image moves fast to the degree that it is over a search range of the vector, the motion vector is not correctly obtained. Thus, there is a case where the motion correction process is incorrectly performed by using the incorrect vector. In this case, there is an issue that an output image is broken. To avoid this issue, in the case of the image moving fast, measures are taken in many cases such that the motion correction process is stopped, and the input image is output as it is with the original position and the original image content. Alternatively, there is a case where some moving-image modes are prepared in the TV receiver. In that case, the motion correction process is turned off when a mode which stops the motion correction process is selected according to user preference.

FIGS. 11A and 11B indicate an example of the frame rate conversion in the case where the motion correction process is stopped. FIG. 11A indicates the input image before the frame rate conversion is performed, and FIG. 11B indicates the output image after the frame rate conversion is performed. In FIGS. 11A and 11B, the vertical axis indicates time and the horizontal axis indicates a position of the image in the horizontal direction.

The content of the input image indicated in FIG. 11A is substantially the same as that of the film image 10 indicated in FIGS. 5 and 6A. The image content is the film image 10 configured by converting the frame rate from 25 fps to 50 fps through a 2-2 pull down. In the case where the film image 10 is input, since the mode is set so that the motion correction process is stopped, the output image after the frame rate conversion is performed is as indicated in FIG. 11B. That is, without shifting the image of the first frame F1, the interpolation frame images with the same position and the same image content as those of the first frame F1 are formed as the frame F1', the frame F2, and the frame F2', and displayed with a frame rate of 100 fps. With such a process, although the judder of the image is not improved from a frame rate of 25 fps which is the same as that in the input image, it is possible to avoid the breaking of the output image which is caused by incorrectly performing the motion correction process through the use of the incorrect vector.

Next, with reference to FIGS. 12A and 12B, the description will be made for the case where the motion correction process is stopped and the frame rate conversion is performed when the image in which the normal image 11 with a frame rate of 50 fps is superimposed on the film image 10 configured by converting the frame rate from 25 fps to 50 fps through a 2-2 pull down. FIG. 12A indicates the input image before the frame rate conversion is performed, and FIG. 12B indicates the output image after the frame rate conversion is performed. In FIGS. 12A and 12B, the vertical axis indicates time, and the horizontal axis indicates a position of the image in the horizontal direction.

The content of the input image indicated in FIG. 12A is the same as that of the image indicated in FIGS. 8 and 9. In the case where the frame rate conversion with the mode which stops the motion correction process is performed to this input image, the image is as indicated in FIG. 12B. That is, without shifting the image of the first frame F1, the interpolation frame images in which the whole images (whole including the film image content portion and the telop portion) with the same position and the same image content as those of the first frame F1 are formed as the frame F1', the frame F2, and the frame F2', and displayed with a frame rate of 100 fps. In this case, as indicated in FIG. 12B, the judder in the film image content portion still has a frame rate of 25 fps which is the same as that in the input image. On the other hand, in the telop portion, the input image has a frame rate of 50 fps, but the image in the output image has a frame rate corresponding to 25 fps which is the same as that in the film image 10. This means that the judder is deteriorated in comparison with the original input image.

In this manner, in the relate art, in the case where the input image is the image in which the normal image and the film image are synthesized, there is an issue that, when the frame rate conversion is performed with the mode which stops the motion correction process, the judder in the normal image portion is deteriorated. In Japanese Patent Publication Nos. 3596521 and 3855761, such an issue is not considered.

In view of the foregoing, it is desirable to provide an image signal processing unit and a method of processing an image signal, which improve image quality after a frame rate conversion is performed in the case where an input signal is an image signal in which, for example, a normal image with a frame rate of 50 fps is superimposed on a film image configured by converting the frame rate from 25 fps to 50 fps through a 2-2 pull down.

According to an embodiment of the present invention, there is provided an image signal processing unit including: a frame rate conversion circuit converting a frame rate of an input image signal from a first frame frequency to a second frame frequency which is twice the first frame frequency, and selecting whether a motion correction process is performed or not at the time of the frame rate conversion. In a case of performing frame rate conversion with the motion correction process, a motion vector is determined between a first frame image and a third frame image in the input image signal, followed by forming three interpolation frame images through performing the motion correction process to the first frame image based on the motion vector, and then the three interpolation frame images are inserted between the first frame image and the third frame image so as to establish the second frame frequency. In a case of performing frame rate conversion without the motion correction process, an interpolation frame image having the same content as the first frame image is formed and inserted between the first frame image and a second frame image in the input image signal, and an interpolation frame image having the same content as the second frame image is formed and inserted between the second frame image and the third frame image.

According to an embodiment of the present invention, there is provided a method of processing an image signal including: a step of converting a frame rate of an input image signal from a first frame frequency to a second frame frequency which is twice the first frame frequency; and selecting whether a motion correction process is performed or not at the time of the frame rate conversion, in the step of converting the frame rate. In a case of performing frame rate conversion with the motion correction process, a motion vector is determined between a first frame image and a third frame image in the input image signal, followed by forming three interpolation frame images through performing the motion correction process to the first frame image based on the motion vector, and then the three interpolation frame images are inserted between the first frame image and the third frame image so as to establish the second frame frequency. In a case of performing frame rate conversion without the motion correction process, an interpolation frame image having the same content as the first frame image is formed and inserted between the first frame image and a second frame image in the input image signal, and an interpolation frame image having the same content as the second frame image is formed and inserted between the second frame image and the third frame image.

In the image signal processing unit or the method of processing the image signal according to the embodiment of the present invention, a frame rate of an input image signal is converted from a first frame frequency to a second frame frequency which is twice the first frame frequency. At the time of the frame rate conversion, in a case of performing frame rate conversion with the motion correction process, a motion vector is determined between a first frame image and a third frame image in the input image signal, followed by forming three interpolation frame images through performing the motion correction process to the first frame image based on the motion vector, and then the three interpolation frame images are inserted between the first frame image and the third frame image so as to establish the second frame frequency. On the other hand, in a case of performing frame rate conversion without the motion correction process, an interpolation frame image having the same content as the first frame image is formed and inserted between the first frame image and a second frame image in the input image signal, and an interpolation frame image having the same content as the second frame image is formed and inserted between the second frame image and the third frame image.

That is, according to the embodiment of the present invention, in the case where the motion correction process is performed, the first frame to the fourth frame with the second frame frequency after the frame rate conversion is performed are the images based on the first frame image in the input image signal. On the other hand, in the case where the motion correction process is not performed, the first frame to the fourth frame with the second frame frequency are the images based on not only the first frame image, but also the second frame image in the input image signal. Thereby, in the case where the motion correction process is not performed, the image quality after the frame rate conversion is performed is improved in comparison with the case where, for example, the frame rate conversion is performed in such a manner that the three interpolation frame images having the same content as the first frame image in the input image signal are formed, and inserted between the first frame image and the third frame image in the input image signal with the second frame frequency. In particular, in the case where the input image is the image in which the normal image is superimposed on the film image, deterioration of the judder in the normal image portion is improved.

In the image signal processing unit or the method of processing the image signal according to the embodiment of the present invention, in the case where the frame rate conversion is performed, each signal is optimally processed according to whether the motion correction process is performed or not. Thus, it is possible to improve the image quality after the frame rate conversion is performed in the case where, for example, the input image signal is the image signal in which the normal image with a frame rate of 50 fps is superimposed on the film image with a frame rate of 25 fps. In particular, in the case where the motion correction process is not performed, deterioration of the judder in the normal image portion is improved.

Other and further objects, features and advantages of the invention will appear more fully from the following description.

BRIEF DESCRIPTION OF THE DRAWINGS

FIGS. 12A and 12B are explanation views of operation in a comparative example when the framer ate conversion is performed to the input image having the format indicated in FIG. 8 while the motion correction process is not performed, FIG. 12A indicates the input image before the frame rate conversion is performed, and FIG. 12B indicates the output image after the frame rate conversion is performed.

DETAILED DESCRIPTION OF THE PREFERRED EMBODIMENT

A preferred embodiment of the present invention will be described in detail with reference to the accompanying drawings.

Figure 1:
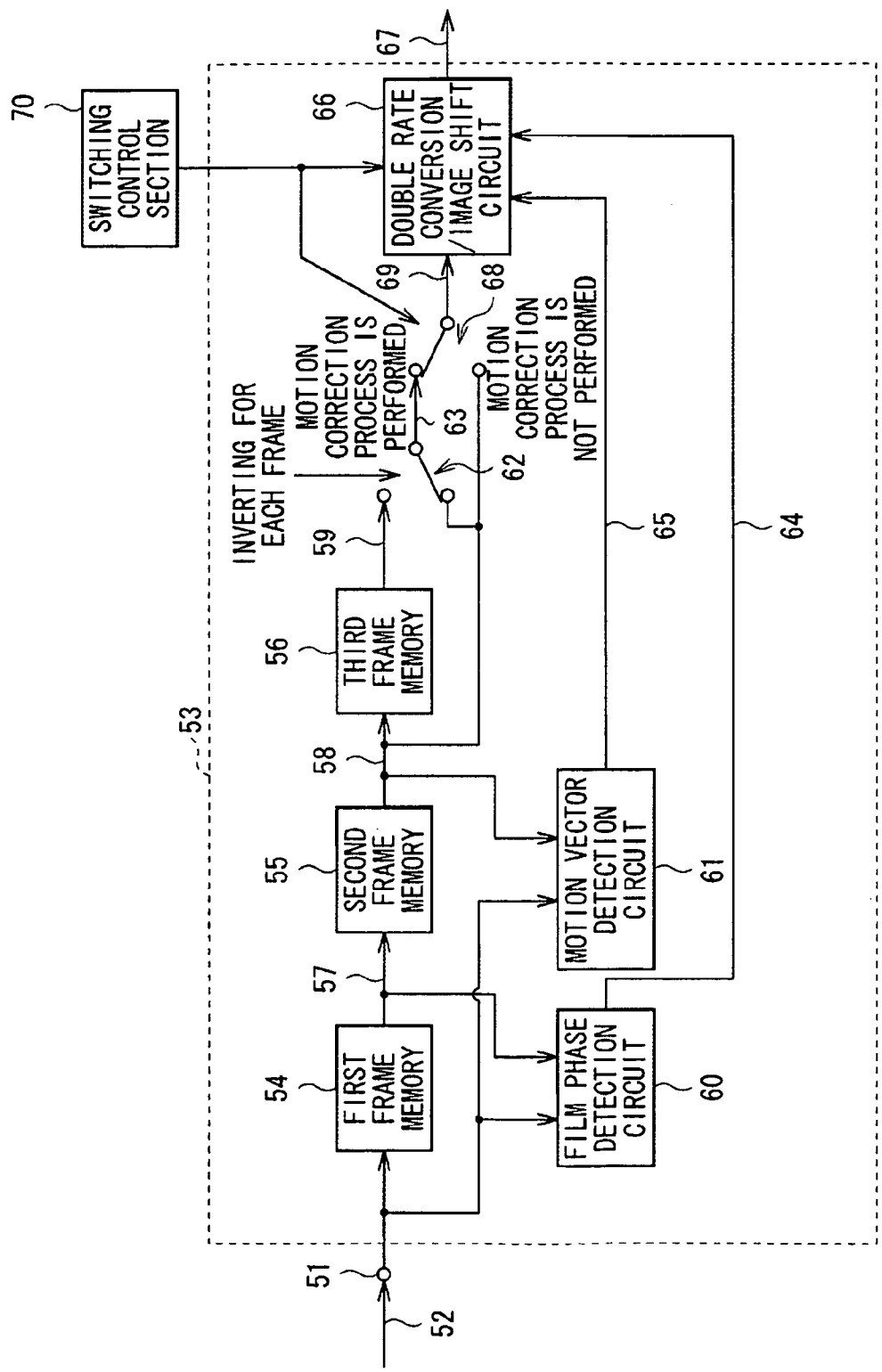
FIG. 1 is a block diagram indicating an example of the configuration of an image signal processing unit according to an embodiment of the present invention.

FIG. 1 indicates an example of the configuration of an image signal processing unit according to an embodiment of the present invention. The image signal processing unit includes an input terminal 51 to which an input signal 52 is input, and a frame rate conversion circuit 53 which performs a frame rate conversion to the input signal 52. The image signal processing unit also includes a switching control section 70 instructing whether the motion correction process is performed or not at the time of the frame rate conversion in the frame rate conversion circuit 53.

The frame rate conversion circuit 53 performs the frame rate conversion so that, in the image signal as being the input signal 52, a first frame frequency (for example, 50 fps) is converted to a second frame frequency (for example, 100 fps) which is twice the first frame frequency. Then, the frame rate conversion circuit 53 outputs an output signal 67 as a result of the frame rate conversion. The frame rate conversion circuit 53 selects whether the motion correction process is performed or not at the time of the frame rate conversion.

Figure 5:
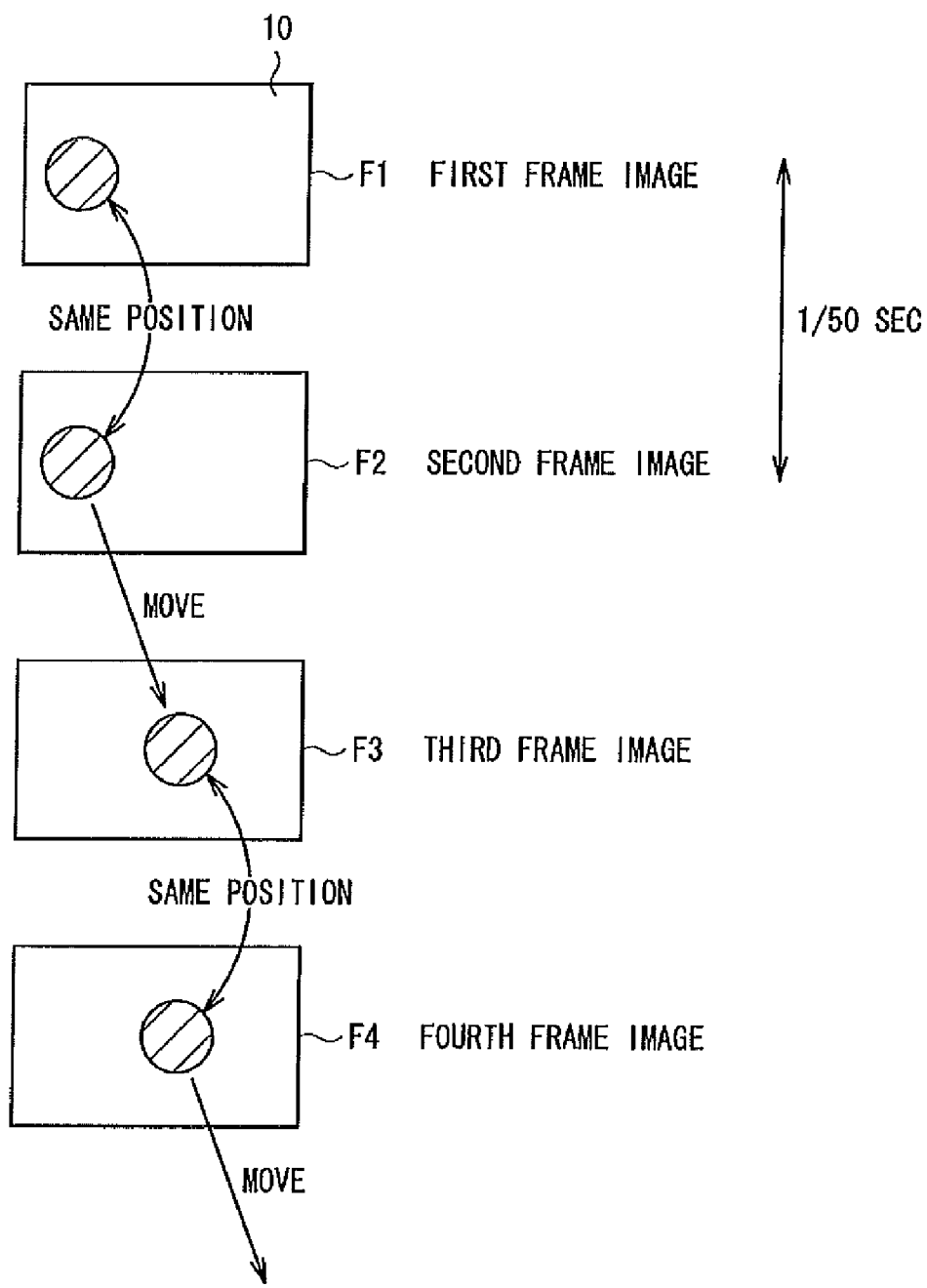
FIG. 5 is an explanation view indicating an example of the 2-2 pull-down film image.
Figure 6:
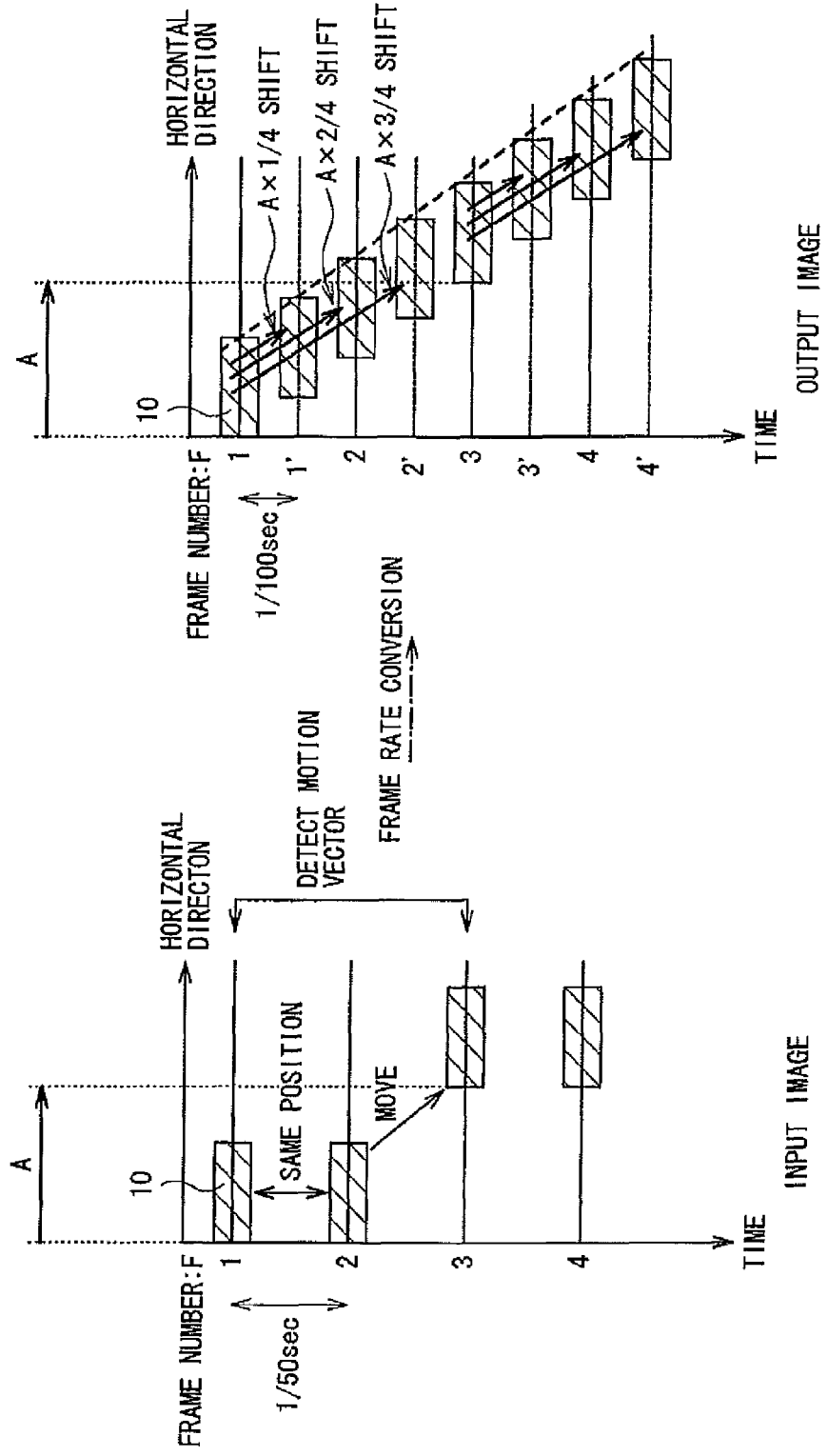
FIGS. 6A and 6B are explanation views of operation when the frame rate conversion involving the motion correction process is performed to an input image with a format indicated in FIG. 5, FIG. 6A indicates an input image before the frame rate conversion is performed, and FIG. 6B indicates an output image after the frame rate conversion is performed.
Figure 7:
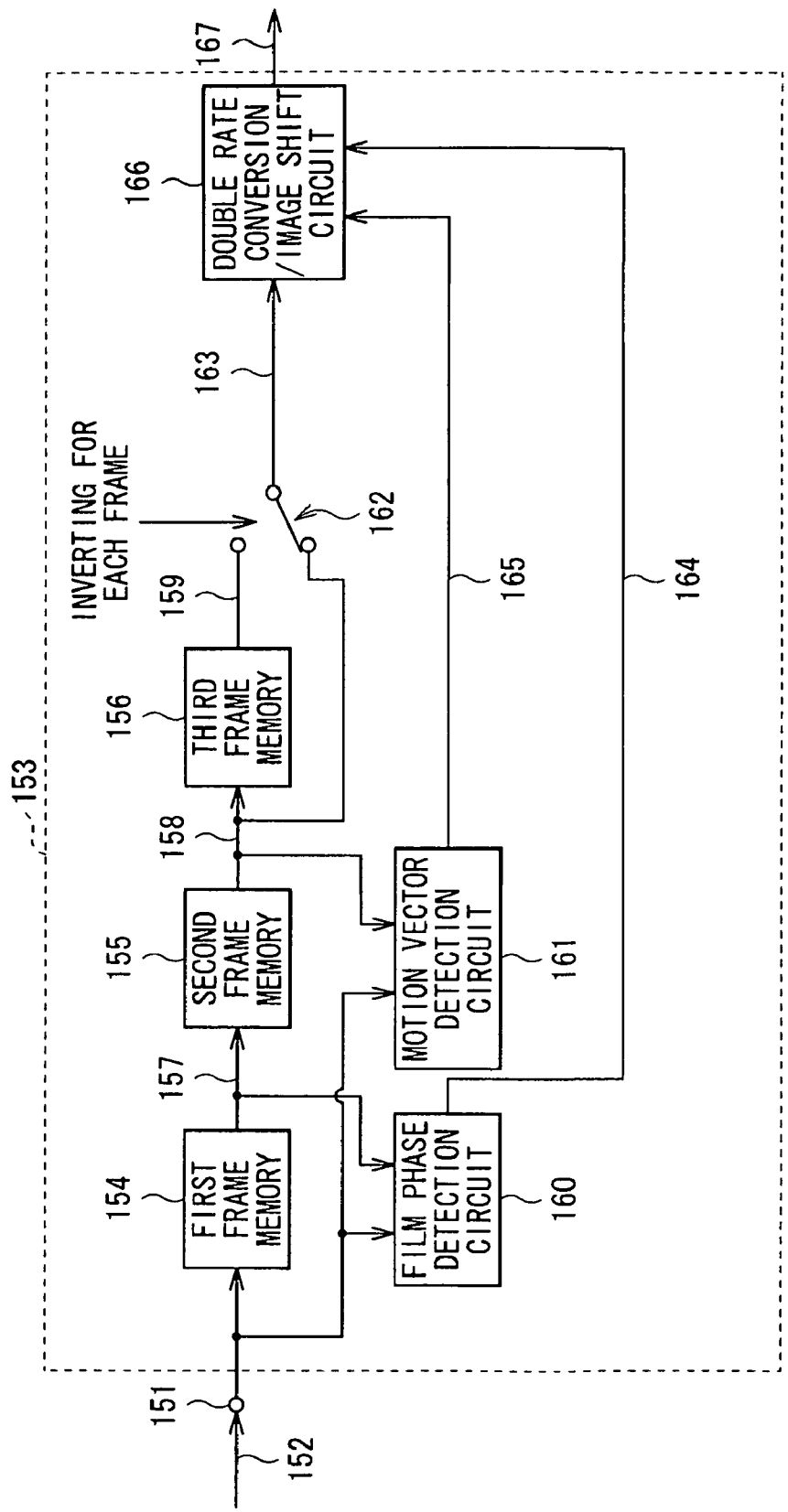
FIG. 7 is a block diagram indicating an example of the configuration of an image signal processing unit of the related art.

The input signal 52 is an image signal in which, for example, each two successive frames with the first frame frequency have the same image content. As an example of such an image signal, FIGS. 5 and 6A indicate a film image configured by converting the frame rate from 25 fps to 50 fps through a 2-2 pull down (as an image format, an image signal with a frame rate of 50 fps). The input signal 52 may be an image signal in which a first image portion and a second image portion are mixed. The first image portion is configured with an image in which each two successive frames have the same image content with the first frame frequency and the second image portion is configured with a moving image with the same frequency as the first frame frequency. As an example of such an image signal, FIGS. 8 and 9 indicate an image signal in which a normal image 11 (second image portion) with a frame rate of 50 fps is superimposed on a film image 10 (first image portion) configured by converting the frame rate from 25 fps to 50 fps through a 2-2 pull down.

The frame rate conversion circuit 53 includes a first frame memory 54, a second frame memory 55, and a third frame memory 56. The frame rate conversion circuit 53 also includes a film phase detection circuit 60, a motion vector detection circuit 61, a first switch 62, a second switch 68, and a double rate conversion/image shift circuit 66.

The first frame memory 54, the second frame memory 55, and the third frame memory 56 are connected in series, and each of the first frame memory 54, the second frame memory 55, and the third frame memory 56 is an image memory temporarily storing image data of one frame. The input signal 52 is input to the first frame memory 54, and the first frame memory 54 outputs a one-frame delayed signal 57 which is one frame delayed from the input signal 52. The one-frame delayed signal 57 output from the first frame memory 54 is input to the second frame memory 55, and the second frame memory 55 outputs a two-frame delayed signal 58 which is two frames delayed from the input signal 52. The two-frame delayed signal 58 output from the second frame memory 55 is input to the third frame memory 56, and the third frame memory 56 outputs a three-frame delayed signal 59 which is three frames delayed from the input signal 52.

The input signal 52 and the one-frame delayed signal 57 are input to the film phase detection circuit 60. On the basis of the input signal 52 and the one-frame delayed signal 57, the film phase detection circuit 60 forms a correction timing signal 64 which takes timing of the image correction at the time of performing the frame rate conversion, and outputs the correction timing signal 64 to the double rate conversion/image shift circuit 66. The input signal 52 and the two-frame delayed signal 58 are input to the motion vector detection circuit 61. On the basis of the input signal 52 and the two-frame delayed signal 58, the motion vector detection circuit 61 obtains a motion vector 65 which is used at the time of performing the motion correction process, and outputs the motion vector 65 to the double rate conversion/image shift circuit 66.

The two-frame delayed signal 58 and the three-frame delayed signal 59 are supplied to the first switch 62. The first switch 62 generally selects an image of an odd-numbered frame in the input image signal by inverting a switching operation for every one frame, and outputs the image as a first selection signal 63.

The two-frame delayed signal 58 and the first selection signal 63 from the first switch 62 are supplied to the second switch 68. The second switch 68 is switchable according to whether the motion correction process is performed or not in the double rate conversion/image shift circuit 66. In the case where the motion correction process is performed, the second switch 68 outputs the first selection signal 63 output from the first switch 62 as it is to the double rate conversion/image shift circuit 66, as a second selection signal 69. In the case where the motion correction process is stopped, the second switch 68 outputs the two-frame delayed signal 58 as the second selection signal 69 to the double rate conversion/image shift circuit 66.

The double rate conversion/image shift circuit 66 performs the frame rate conversion to the input signal 52 on the basis of the correction timing signal 64 output from the film phase detection circuit 60, the motion vector 65 output from the motion vector detection circuit 61, and the second selection signal 69 output from the second switch 68, and outputs an output signal 67 which has the frame frequency twice that of the input signal 52. Like a specific example which will be described later, the double rate conversion/image shift circuit 66 performs an optimal frame rate conversion according to whether the motion correction process is performed or not.

The switching control section 70 performs a switching control of the second switch 68 according to whether the motion correction process is performed or not. The switching control section 70 also instructs to the double rate conversion/image shift circuit 66 whether the motion correction process is performed or not at the time of the frame rate conversion. According to user preference, the determination whether the motion correction process is performed or not at the time of performing the frame rate conversion may be selectable through, for example, an operation section not illustrated in the figure. In this case, the switching control section 70 determines whether the motion correction process is performed or not on the basis of the instruction from the user, and appropriately instructs to the second switch 68 and the double rate conversion/image shift circuit 66. In the case of an image particularly moving fast, there are many cases that the motion correction process is incorrectly performed, and the output image is broken. Thus, such an image moving fast is automatically detected in the frame rate conversion circuit 53, and the motion correction process may be automatically turned on or off. In this case, it is possible that the determination whether it is an image moving fast or not is performed, for example, on the basis of the motion vector detected in the motion vector detection circuit 61.

In the embodiment, the frame rate conversion circuit 53 corresponds to a specific example of "a frame rate conversion circuit" in the present invention. The first frame memory 54, the second frame memory 55, and the third frame memory 56 each corresponds to a specific example of "an image memory" in the present invention. The first switch 62 corresponds to a specific example of "a first switch" in the present invention, and the second switch 68 corresponds to a specific example of "a second switch" in the present invention. The double rate conversion/image shift circuit 66 corresponds to a specific example of "a conversion circuit" in the present invention.

Next, operation of the image signal processing unit according to the embodiment will be described.

In the image signal processing unit, the input signal 52 is input from the input terminal 51 to the frame rate conversion circuit 53. In the frame rate conversion circuit 53, the image is delayed with the frame memories 54 and 55 which are frame memories for two frames, and, by using the input signal 52 and the two-frame delayed signal 58, the motion vector 65 between two frames is obtained in the motion vector detection circuit 61 by block matching method or the like. By using the input signal 52 and the one-frame delayed signal 57, a correction timing in accordance with a film phase of the input image is obtained in the film phase detection circuit 60. Moreover, the above-mentioned two-frame delayed signal 58 is further delayed by one frame in the third frame memory 56, thereby obtaining the three-frame delayed signal 59. The two-frame delayed signal 58 and the three-frame delayed signal 59 are supplied to the first switch 62. In the first switch 62, a switching operation is inverted for every one frame. Thereby, the image of the odd-numbered frame in the input image (input signal 52) is generally selected, and regarded as the first selection signal 63. The two-frame delayed signal 58 and the first selection signal 63 from the first switch 62 is supplied to the second switch 68. The second switch 68 is switchable according to whether the motion correction process is performed or not in the double rate conversion/image shift circuit 66.

Here, in the case where the motion correction process is performed, the first selection signal 63 from the first switch 62 is output as it is. That is, the image signal of the odd-numbered frame in the input image is output as the second selection signal 69 to the double rate conversion/image shift circuit 66. Moreover, the motion vector 65 and the correction timing signal 64 are input to the double rate conversion/image shift circuit 66. In the double rate conversion/image shift circuit 66, the frame rate of the image of the odd-numbered frame is converted so that the converted frame rate is twice that of the input signal 52. Then, like a specific example which will be described later, the image position is suitably and appropriately shifted in response to the motion vector 65 and the correction timing signal 64. Thereby, the output signal 67 whose motion is improved to be smooth is obtained.

In the case where the motion correction process is not performed, the two-frame delayed signal 58 is output as the second selection signal 69 to the double rate conversion/image shift circuit 66. In the double rate conversion/image shift circuit 66, like a specific example which will be described later, the frame rate of the two-frame delayed signal 58 is appropriately converted so that the converted frame rate is twice that of the input signal 52. Thereby, the output signal 67 in which deterioration of the judder is prevented in comparison with the case of the related art is obtained.

Next, a specific example of the frame rate conversion in the case where the motion correction process is performed and in the case where the motion correction process is not performed will be described.

Figure 8:
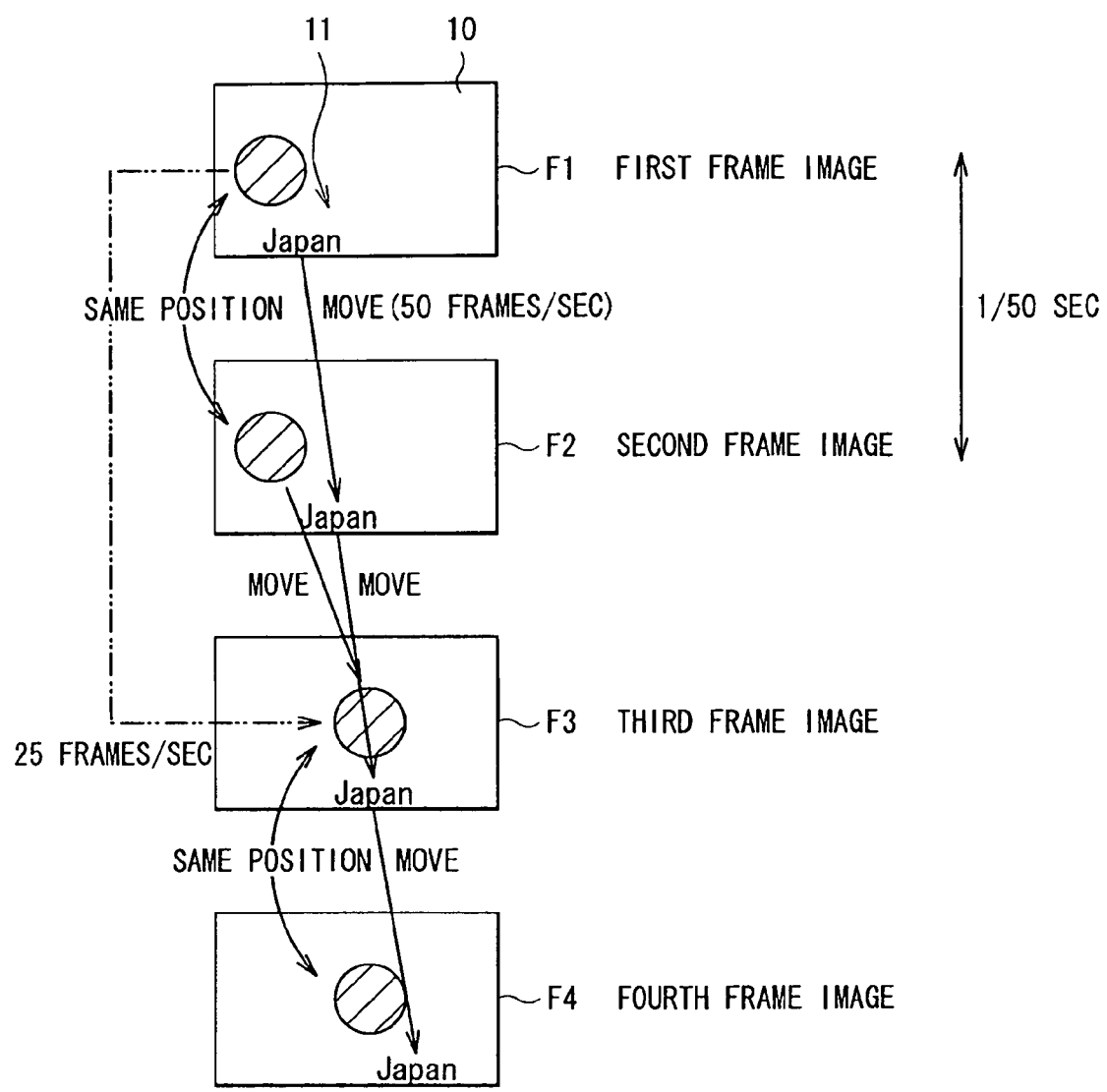
FIG. 8 is an explanation view indicating an example of an image in which a normal image is superimposed on a 2-2 pull-down film image.

FIG. 8 indicates an example of an image in which the normal image 11 with a frame rate of 50 fps is superimposed on the film image 10 configured by converting the frame rate from 25 fps to 50 fps through a 2-2 pull down. In this example, the telop (normal image 11) moving to the right with a frame rate of 50 fps is superimposed on the background screen (film image 10) moving to the right with a frame rate of 25 fps in the screen. The background screen is the film image 10 as in the example of FIG. 5. The first frame F1 and the second frame F2 have the same image content, and the moving object is in the same position. After that, the image content changes in the third frame F3 which is two frames after the first frame F1, and the object moves. On the other hand, the superimposed telop is displayed while the position of the telop moves in each frame with a frame rate of 50 fps.

Figure 9:
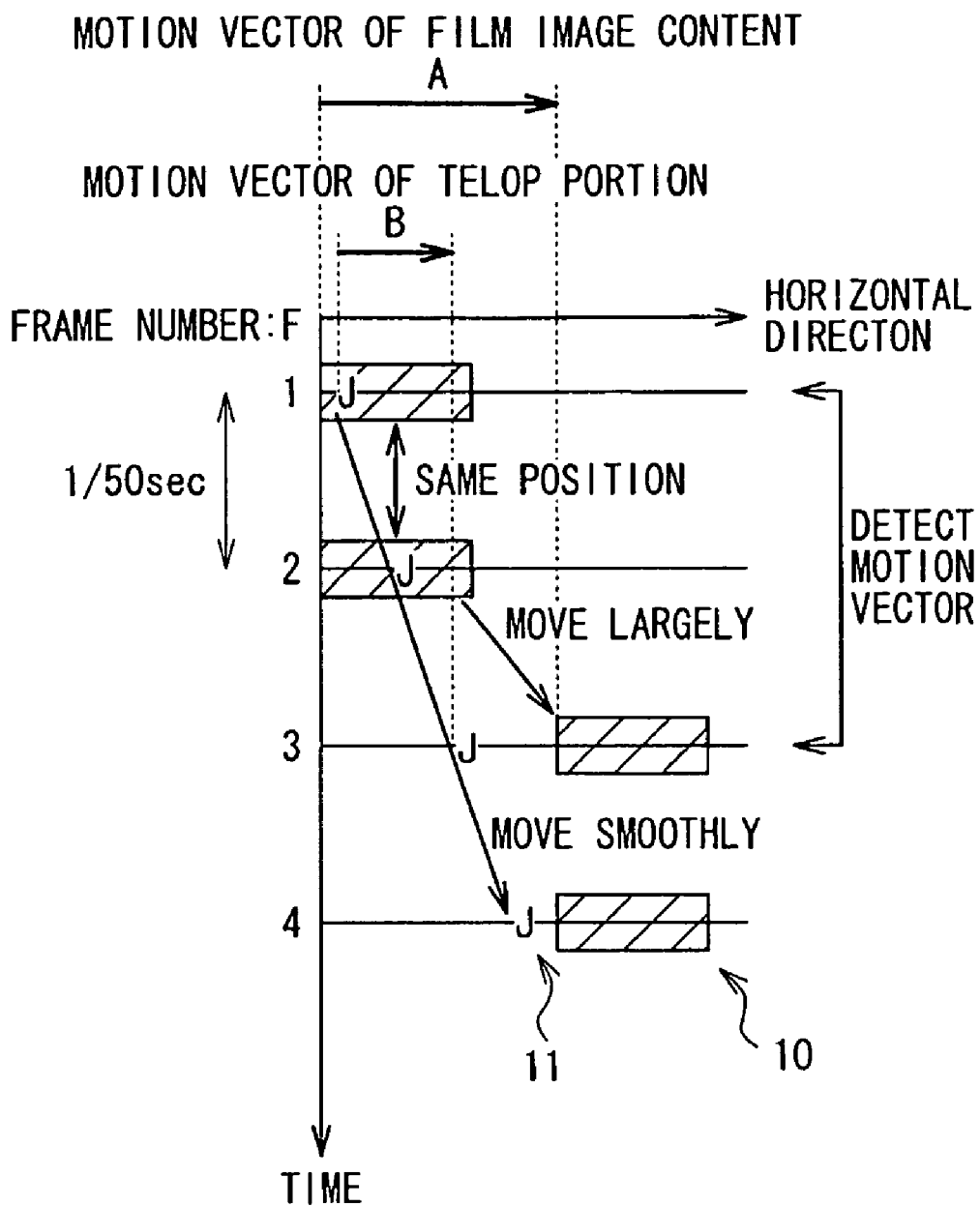
FIG. 9 is an explanation view indicating the input image before the frame rate conversion is performed, the input image having a format corresponding to the format indicated in FIG. 8.
Figure 10:
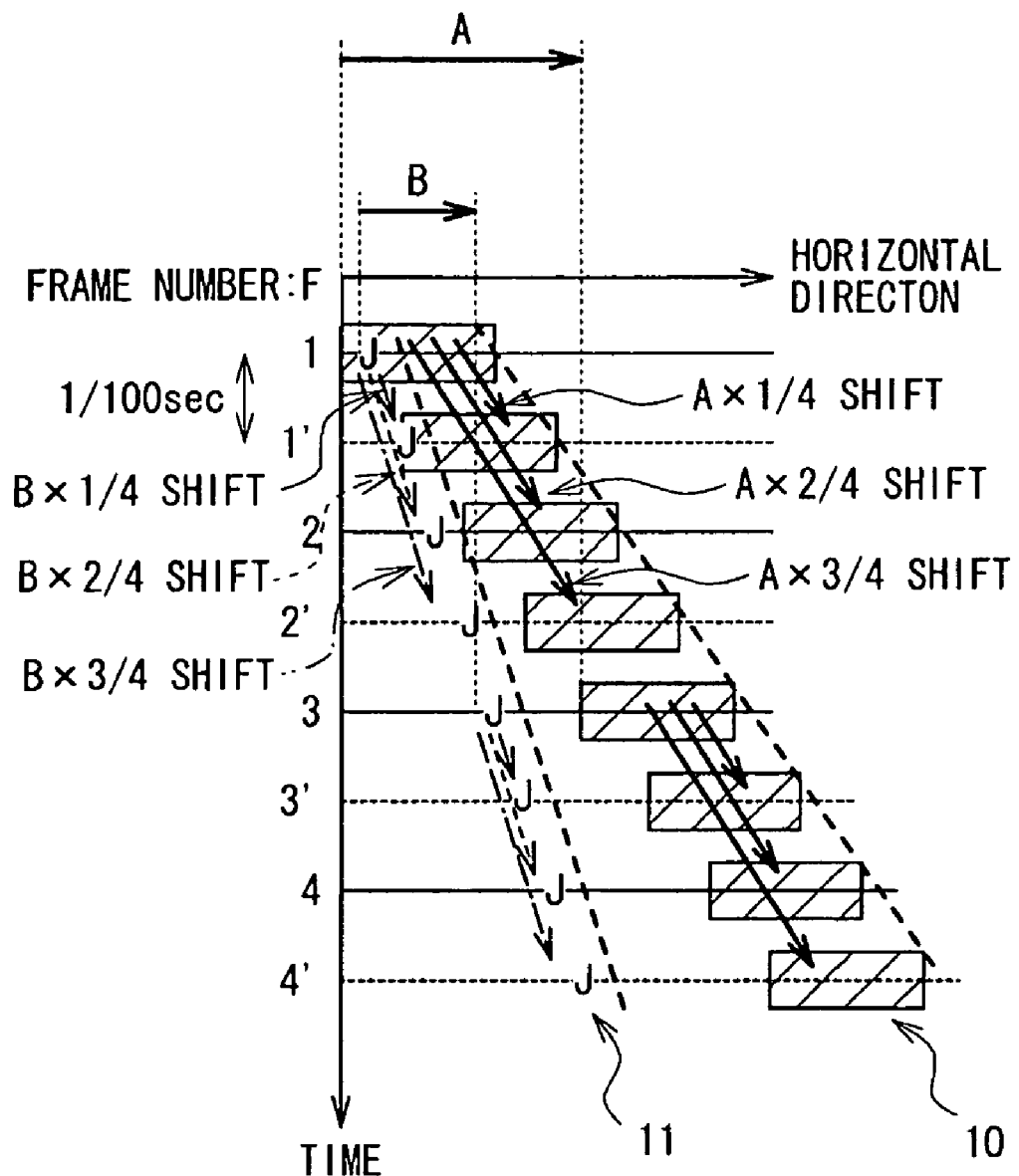
FIG. 10 is an explanation view of operation when the frame rate conversion involving the motion correction process is performed to the input image having the format indicated in FIG. 9.
Figures 11A, 11B:
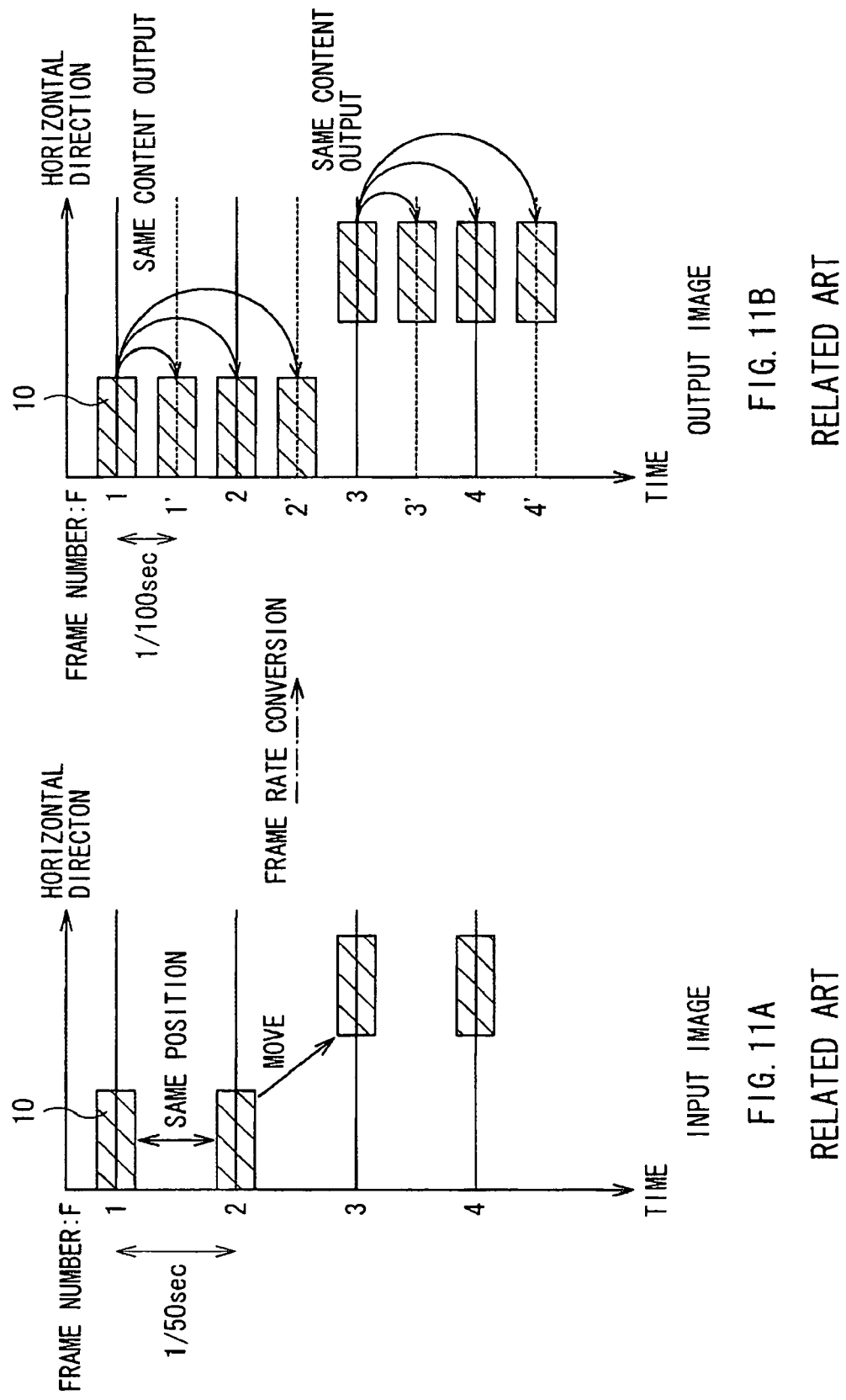
FIGS. 11A and 11B are explanation views of operation in a comparative example when the frame rate conversion is performed to the input image having the format indicated in FIG. 5 while the motion correction process is not performed, FIG. 11A indicates the input image before the frame rate conversion is performed, and FIG. 11B indicates the output image after the frame rate conversion is performed.

With reference to FIGS. 9 and 10, the description will be made for the process when the frame rate conversion involving the motion correction process is performed in the case where the image as in FIG. 8 is input as the input signal 52. FIG. 9 indicates the input image before the frame rate conversion is performed, and FIG. 10 indicates the output image after the frame rate conversion involving the motion correction process is performed. In FIGS. 9 and 10, the vertical axis indicates time, and the horizontal axis indicates a position of the image in the horizontal direction.

The content of the input image indicated in FIG. 9 is substantially the same as that of the image indicated in FIG. 8. Similarly to FIG. 8, the image content in FIG. 9 is an image in which the normal image 11 with a frame rate of 50 fps is superimposed on the film image 10 configured by converting the frame rate from 25 fps to 50 fps through a 2-2 pull down. In the motion vector detection circuit 61, as indicated in FIG. 9, in the input image, between the first frame F1 and the third frame F3 which is two frames after the first frame F1, the motion vector of the image is obtained by, for example, block matching method as a known method. The motion vector of the image is obtained for each pixel unit, or for each block having a certain size. Here, the motion vector amount of the object in the film image portion with a frame rate of 25 fps is regarded as A. The motion vector amount in the superimposed telop portion with a frame rate of 50 fps is regarded as B.

In the double rate conversion/image shift circuit 66, as indicated in FIG. 10, in accordance with the obtained motion vector amount A, the film image portion in the image of the first frame F1 in the input image is shifted by the amounts of $A \times \frac{1}{4}$, $A \times \frac{2}{4}$, and $A \times \frac{3}{4}$. In accordance with the obtained motion vector amount B, the telop portion in the image of the first frame F1 in the input image is shifted by the amounts of $B \times \frac{1}{4}$, $B \times \frac{2}{4}$, and $B \times \frac{3}{4}$. The images in which the telop portions obtained by shifting are superimposed on the film image portions obtained by shifting, respectively, are inserted as the frame F1', the frame F2, and the frame F2' between the first frame F1 and the third frame F3 in the input image with a frame rate of 100 fps.

In this manner, even in the case where the image on which the normal image 11 with a frame rate of 50 fps is superimposed is input as the input image, the same process is performed as in the above-described case where the image configured with only the film image 10 is input as the input image (FIGS. 6A and 6B), and thereby it is realized that both of the film image portion and the normal image portion (telop) smoothly move with a frame rate of 100 fps.

Figures 2A, 2B:
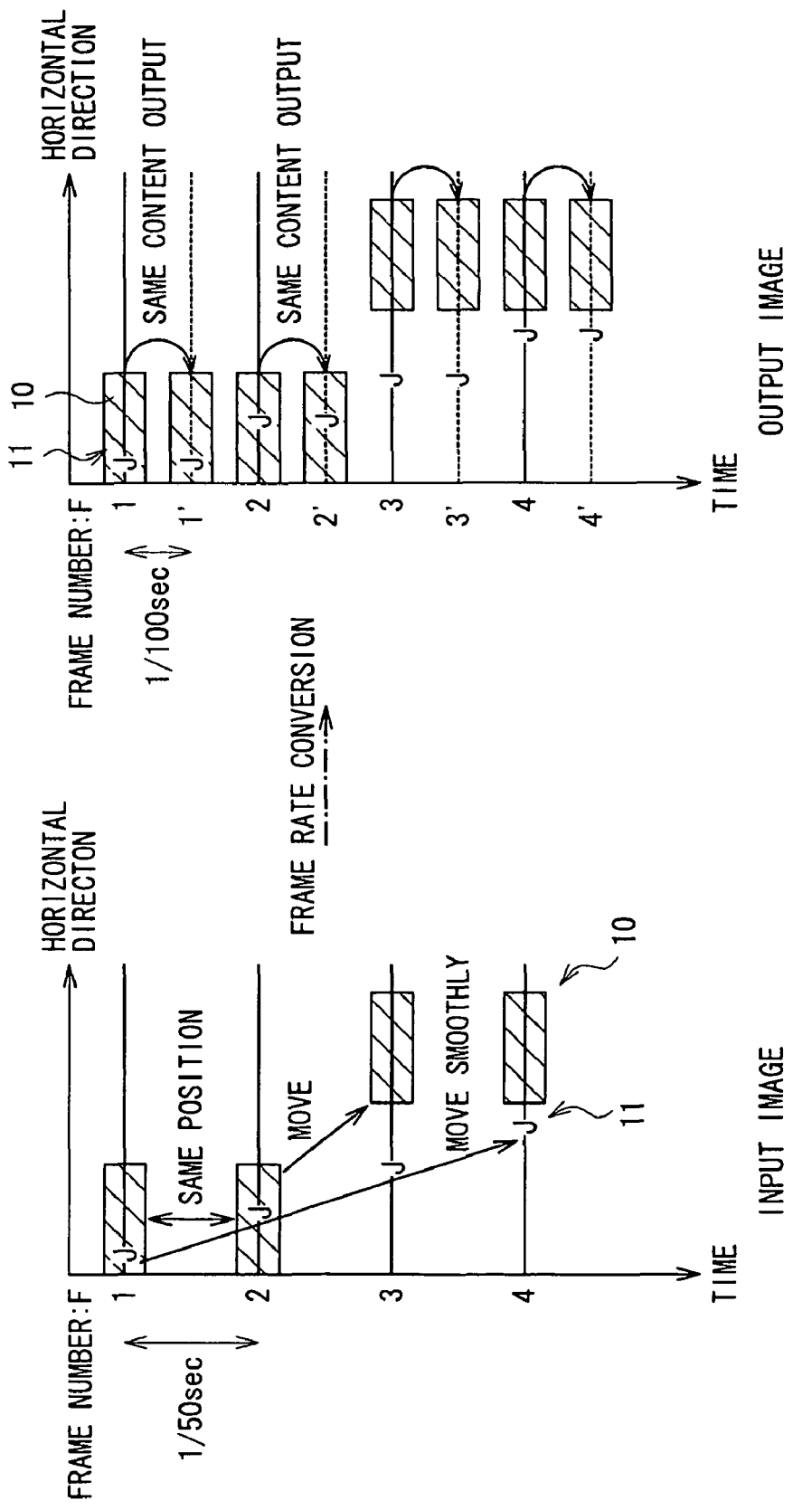
FIGS. 2A and 2B are explanation views of a frame rate conversion in the image signal processing unit according to the embodiment of the present invention, FIG. 2A indicates an input image before the frame rate conversion is performed, and FIG. 2B indicates an output image after the frame rate conversion is performed to the input image while a motion correction process is turned off.

Next, with reference to FIGS. 2A and 2B, the description will be made for the case where the frame rate conversion is performed while the motion correction process is stopped when the image in which the normal image 11 with a frame rate of 50 fps is superimposed on the 2-2 pull-down film image 10 with a frame rate of 25 fps is input as the input image 52. FIG. 2A indicates the input image before the frame rate conversion is performed, and FIG. 2B indicates the output image after the frame rate conversion is performed. In FIGS. 2A and 2B, the vertical axis indicates time, and the horizontal axis indicates a position of the image in the horizontal direction.

The content of the input image indicated in FIG. 2A is the same as that of the image indicated in FIGS. 8 and 9. In the case where the frame rate conversion with the mode which stops the motion correction process is performed to this input image, the image is as indicated in FIG. 2B. That is, in the double rate conversion/image shift circuit 66, without shifting the image of the first frame F1, the interpolation frame image in which the whole image (whole including the film image content portion and the telop portion) with the same position and the same image content as those of the first frame F1 is formed as the frame F1', and inserted between the first frame F1 and the second frame F2 in the input image with a frame rate of 100 fps. Similarly, in the case of the second frame F2, the interpolation frame image in which the whole image (whole including the film image content portion and the telop portion) with the same position and the same image content as those of the second frame F2 is formed as the frame F2', and inserted between the second frame F2 and the third frame F3 in the input image with a frame rate of 100 fps. The same process is performed for the subsequent frames. With such a process, as indicated in FIG. 2B, the judder in the film image content portion still has a frame rate of 25 fps which is the same as that in the input image. The judder in the telop portion also still has a frame rate of 50 fps which is the same as that in the input image. Thereby, deterioration of the judder is prevented.

That is, in the embodiment, in the case where the motion correction process is performed, the first frame to the fourth frame F1, F1', F2, and F2' with the second frame frequency (frame rate of 100 fps) after the frame rate conversion is performed are the images based on the first frame F1 in the input image signal. On the other hand, in the case where the motion correction process is not performed, the first frame to the fourth frame F1, F1', F2, and F2' with the second frame frequency are the images based on not only the first frame F1, but also the second frame F2 in the input image signal. Thereby, in the case where the motion correction process is not performed, the image quality after the frame rate conversion is performed is improved in comparison with the case where, for example, the frame rate conversion is performed in such a manner that the interpolation frame images of three frames with the same content as that of the first frame F1 in the input image signal are formed, and inserted between the first frame F1 and the third frame F3 in the input image signal with the second frame frequency (refer to FIGS. 12A and 12B). In particular, in the case where the input image is the image in which the normal image is superimposed on the film image, deterioration of the judder in the normal image portion is improved.

In the specific example described above, the description is made for the image signal as being the input signal 52 in which the normal image 11 with a frame rate of 50 fps is superimposed on the film image 10 configured by converting the frame rate from 25 fps to 50 fps through a 2-2 pull down. However, the same process is performed in the case where the input signal 52 is configured with only the film image 10.

Figures 4A, 4B:
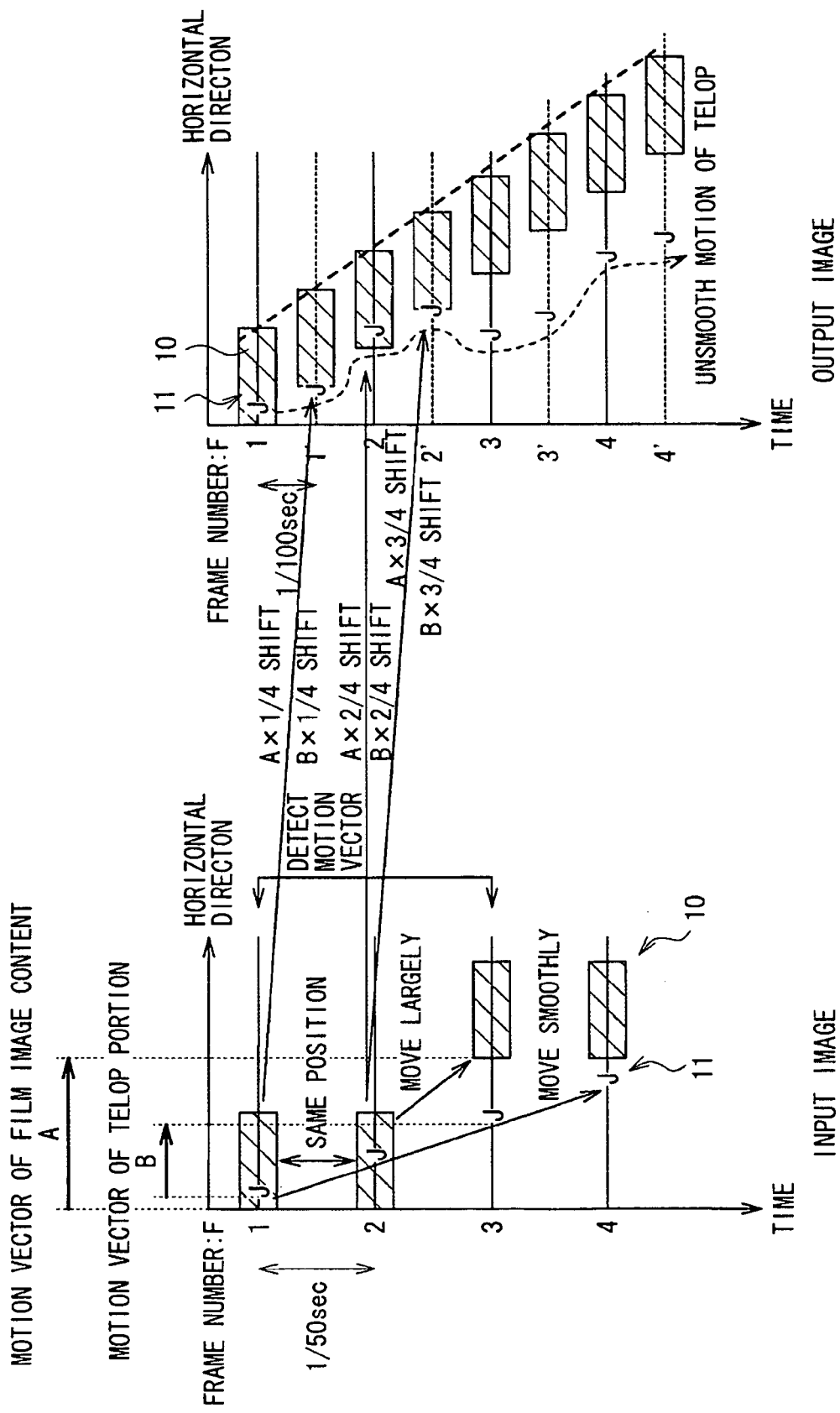
FIG. 4 is an explanation view indicating a comparative example of the frame rate conversion.

Here, as a comparative example to the specific example where the motion correction process is performed as indicated in FIGS. 9 and 10, the case where the process is performed as indicated in FIGS. 4A and 4B is considered. FIG. 4A indicates the input image before the frame rate conversion is performed, and FIG. 4B indicates the output image after the frame rate conversion is performed. In FIGS. 4A and 4B, the vertical axis indicates time, and the horizontal axis indicates a position of the image in the horizontal direction.

The content of the input image indicated in FIG. 4A is the same as that of the image indicated in FIGS. 8 and 9. When the motion correction process is performed as indicated in FIG. 4B, it is assumed that the frames F1 and F1' in the output image are formed on the basis of the first frame F1 in the input image, and the frames F2 and F2' in the output image are formed on the basis of the second frame F2 in the input image. More specifically, the film image portion in the image of the first frame F1 in the input image is shifted by the amount of A×¼ in accordance with the motion vector amount A, and the telop portion is shifted by the amount of B×¼ in accordance with the motion vector amount B, thereby forming the frame F1' in the output image. Moreover, the film image portion in the image of the second frame F2 in the input image is shifted by the amounts of A×²⁄₄ and A×¾ in accordance with the motion vector amount A, and the telop portion is shifted by the amounts of B×²⁄₄ and B×¾ in accordance with the motion vector amount B, thereby forming the frames F2 and F2' in the output image.

In the case of such a method, as indicated in FIG. 4B, the smooth output image with a frame rate of 100 fps is obtained in the film image portion. However, the image with unsmooth motion is obtained in the normal image portion (telop). Accordingly, irrespective of whether the motion correction process is performed or not, when the frame F1' in the output image is formed on the basis of the first frame F1 in the input image, and the frames F2 and F2' in the output image are formed on the basis of the second frame F2 in the input image, the image quality is generally deteriorated. As in the embodiment, according to whether the motion correction process is performed or not, it is necessary to appropriately switch the frame which is used as the basis when forming the interpolation images. That is, when the motion correction process is performed, all of the frames F1', F2, and F2' in the output image are formed on the basis of the first frame F1 in the input image. When the motion correction process is not performed, the frame F1' in the output image is formed on the basis of the first frame F1 in the input image, and the frames F2 and F2' in the output image are formed on the basis of the second frame F2 in the input image. In this manner, it is necessary to appropriately switch the frames used as the basis.

Figure 3:
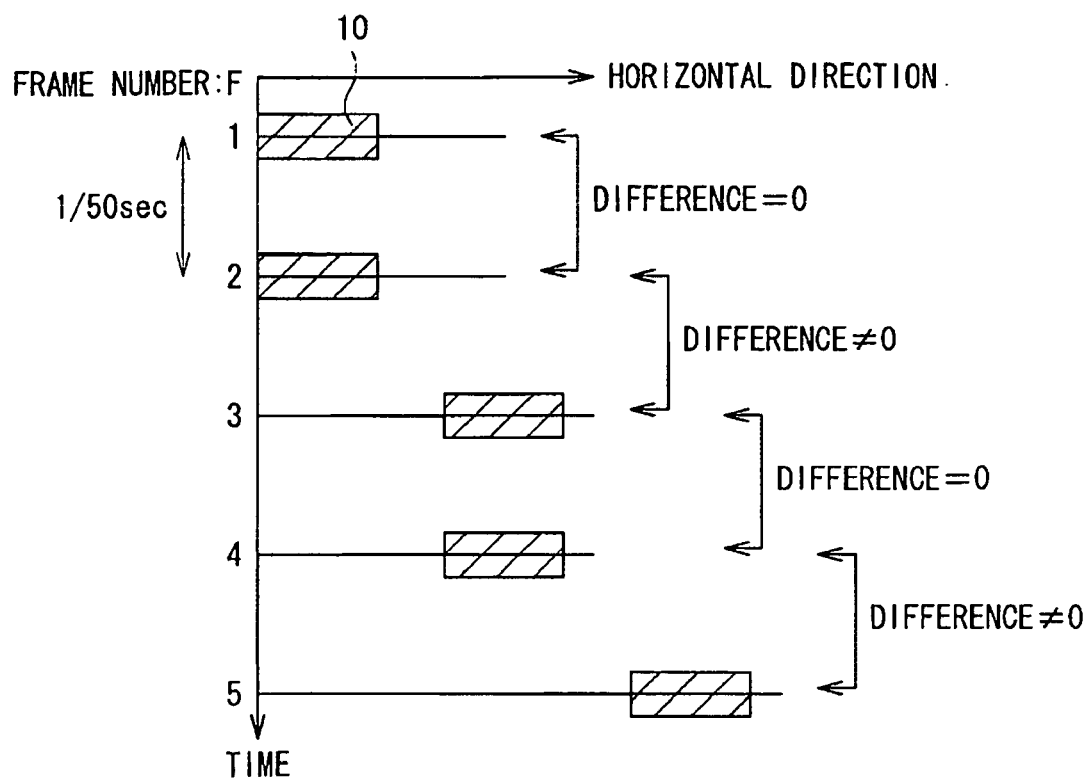
FIG. 3 is an explanation view indicating a method of phase detection to a 2-2 pull-down film image signal.

FIG. 3 indicates a method of the phase detection to the film image signal configured by converting the frame rate from 25 fps to 50 fps through a 2-2 pull down. In the embodiment, when the motion correction process is performed, for example, as indicated in FIG. 9, it is necessary to obtain the motion vector between the first frame F1 and the third frame F3 which is two frames after the first frame F1 in the input image. In this case, although the signal format of the input signal 52 is a frame rate of 50 fps, the image signal which is the base of the input signal 52 has a frame rate of 25 fps. Thus, it is necessary to know which frame in the input image with a frame rate of 50 fps corresponds to which phase of the film image with a frame rate of 25 fps. In the film phase detection circuit 60, to perform this film phase detection, it is utilized that each two successive frames in the film image signal configured by converting the frame rate from 25 fps to 50 fps through a 2-2 pull down have the same image content. That is, the first frame F1 and the second frame F2 have the same content, and the third frame F3 and the fourth frame F4 have the same content. Similarly, in the subsequent frames, it is utilized that each two successive frames have the same image content, and the same image content is displayed twice.

As in FIG. 3, when the difference between the two frames immediately adjacent to each other in the input image signal is obtained, a change in the film phase is detected in a two-frame cycle as follows, the difference between the first frame F1 and the second frame F2 is zero the difference between the second frame F2 and the third frame F3 is not zero the difference between the third frame F3 and the fourth frame F4 is zero the difference between the fourth frame F4 and the fifth frame F5 is not zero By utilizing this, it is possible to detect the film phase in the two-frame cycle.

As described above, in the image signal processing unit according to the embodiment, in the case where the frame rate conversion is performed, each signal is optimally processed according to whether the motion correction process is performed or not. Thus, it is possible to improve the image quality after the frame rate conversion is performed in the case where, for example, the input image signal is the image signal in which the normal image with a frame rate of 50 fps is superimposed on the film image configured by converting the frame rate from 25 fps to 50 fps through a 2-2 pull down. In particular, in the case where the motion correction process is not performed, deterioration of the judder in the normal image portion is improved.

The present invention is not limited to the embodiment, and various modifications may be made.

For example, the format of the input signal applied in the present invention is not limited to the film image signal configured by converting the frame rate from 25 fps to 50 fps through a 2-2 pull down, in the TV signal with a frame rate of 50 fps, which is described in the embodiment. For example, the present invention is also applicable to the case where the content of the image is a CG (computer graphics) image with a frame rate of 30 fps in the TV signal with a frame rate of 60 fps. Moreover, it is obvious that the present invention is applicable to not only the TV receiver, but also a signal converter or the like to which the TV receiver is connected.

It should be understood by those skilled in the art that various modifications, combinations, sub-combinations and alterations may occur depending on design requirements and other factors insofar as they are within the scope of the appended claims or the equivalents thereof.

What is claimed is:

1. An image signal processing unit comprising:
a frame rate conversion circuit converting a frame rate of an input image signal from a first frame frequency to a second frame frequency which is twice the first frame frequency, and selecting whether a motion correction process is performed or not at the time of the frame rate conversion, wherein,
in a case of performing frame rate conversion with the motion correction process, a motion vector is determined between a first frame image and a third frame image in the input image signal, followed by forming three interpolation frame images through performing the motion correction process to the first frame image based on the motion vector, and then the three interpolation frame images are inserted between the first frame image and the third frame image so as to establish the second frame frequency, and
in a case of performing frame rate conversion without the motion correction process, an interpolation frame image having the same content as the first frame image is formed and inserted between the first frame image and a second frame image in the input image signal, and an interpolation frame image having the same content as the second frame image is formed and inserted between the second frame image and the third frame image,
wherein the frame rate conversion circuit includes:
an image memory into which the input image signal is inputted, and outputting a two-frame delayed signal which is delayed by two frames from the input image signal and a three-frame delayed signal which is delayed by three frames from the input image signal,
a first switch into which the two-frame delayed signal and the three-frame delayed signal delayed in the image memory are inputted, and outputting a signal of an odd numbered frame in the input image signal through a switching operation to alternately select either the two-frame delayed signal or the three-frame delayed signal for every frame period,
a second switch into which the output signal from the first switch and the two-frame delayed signal delayed in the image memory are inputted, and selecting and outputting one of the output signal from the first switch and the two-frame delayed signal according to whether the motion correction process is performed or not at the time of the frame rate conversion, and
a conversion circuit performing the frame rate conversion based on the signal selected in the second switch.

2. The image signal processing unit according to claim 1, wherein the input image signal is configured with a synthetic image signal as a synthesis of a first image portion and a second image portion, the first image portion being configured with a first image stream with the first frame frequency where each two successive frames have a same image content, and the second image portion being configured with a second image stream with a frequency same as the first frame frequency.

3. The image signal processing unit according to claim 2, wherein the first image portion is an image stream acquired through performing a 2-2 pull down signal format conversion on a film image, the conversion from a frame frequency half of the first frame frequency to the first frame frequency.

4. A method of processing an image signal comprising:
converting a frame rate of an input image signal from a first frame frequency to a second frame frequency which is twice the first frame frequency; and
selecting whether a motion correction process is performed or not at the time of the frame rate conversion, in the step of converting the frame rate, wherein,
in a case of performing frame rate conversion with the motion correction process, a motion vector is determined between a first frame image and a third frame image in the input image signal, followed by forming three interpolation frame images through performing the motion correction process to the first frame image based on the motion vector, and then the three interpolation frame images are inserted between the first frame image and the third frame image so as to establish the second frame frequency, and
in a case of performing frame rate conversion without the motion correction process, an interpolation frame image having the same content as the first frame image is formed and inserted between the first frame image and a second frame image in the input image signal, and an interpolation frame image having the same content as the second frame image is formed and inserted between the second frame image and the third frame image,
wherein the converting and selecting are performed by a frame rate conversion circuit which includes an image memory, a first switch, a second switch, and a conversion circuit, and
wherein the method further comprises:
inputting the input image signal into the image memory, and outputting a two-frame delayed signal which is delayed by two frames from the input image signal and a three-frame delayed signal which is delayed by three frames from the input image signal,
inputting to the first switch the two-frame delayed signal and the three-frame delayed signal delayed in the image memory, and outputting a signal of an odd numbered frame in the input image signal through a switching operation to alternately select either the two-frame delayed signal or the three-frame delayed signal for every frame period,
inputting to the second switch the output signal from the first switch and the two-frame delayed signal delayed in the image memory, and selecting and outputting one of the output signal from the first switch and the two-frame delayed signal according to whether the motion correction process is performed or not at the time of the frame rate conversion, and
performing the frame rate conversion based on the signal selected in the second switch by utilizing the conversion circuit.

* * * * *